United States Patent [19]
Frigger

[11] Patent Number: 4,825,989
[45] Date of Patent: May 2, 1989

[54] ANTI-LOCK BRAKE SYSTEM WITH CLUTCH OR TRANSMISSION CONTROL

[75] Inventor: Heinz Frigger, Langen-Oberlinden, Fed. Rep. of Germany

[73] Assignee: Alfred Teves GmbH, Frankfurt am Main, Fed. Rep. of Germany

[21] Appl. No.: 47,765

[22] Filed: May 8, 1987

[30] Foreign Application Priority Data

May 9, 1996 [DE] Fed. Rep. of Germany ....... 3615639

[51] Int. Cl.$^4$ .............................................. B60K 41/24
[52] U.S. Cl. .................................. 192/13 R; 192/4 A; 180/197
[58] Field of Search .................. 192/0.044, 0.055, 4 A, 192/13 R; 303/96, 111; 364/426; 180/197

[56] References Cited

U.S. PATENT DOCUMENTS

| | | | |
|---|---|---|---|
| 3,586,920 | 6/1971 | Wakamatsu et al. | 192/13 R X |
| 3,610,362 | 10/1971 | Toyama et al. | 192/13 R X |
| 3,637,057 | 1/1972 | Okamoto | 192/13 R |
| 3,832,009 | 8/1974 | Leiber et al. | 303/96 |
| 3,863,730 | 2/1975 | Wakamatsu et al. | 192/13 R X |
| 4,491,919 | 1/1985 | Leiber | 364/426 |
| 4,611,858 | 9/1986 | Belart | 303/111 X |
| 4,676,353 | 6/1987 | Matsuda | 192/13 R |

FOREIGN PATENT DOCUMENTS

| | | | |
|---|---|---|---|
| 2049262 | 4/1972 | Fed. Rep. of Germany . | |
| 3435869 | 4/1986 | Fed. Rep. of Germany | 364/426 |
| 79045 | 6/1981 | Japan | 192/13 R |
| 148349 | 7/1920 | United Kingdom . | |
| 2144188 | 2/1985 | United Kingdom | 180/197 |
| 2158903 | 11/1985 | United Kingdom . | |
| 2163511 | 2/1986 | United Kingdom | 192/0.055 |
| 821240 | 4/1981 | U.S.S.R. | 192/4 A |

Primary Examiner—Rodney H. Bonck
Assistant Examiner—Richard M. Lorence
Attorney, Agent, or Firm—James B. Raden

[57] ABSTRACT

An anti-lock brake system, for automotive vehicles is disclosed including a braking pressure generator, an auxiliary-pressure source and wheel sensors and electronic circuits for determining the wheel rotational behavior and for generating electric braking pressure control signals which control pressure-fluid inlet valves and pressure-fluid outlet valves provided in brake pressure-fluid lines. A drive train is provided between an engine and the driven wheels with an adjusting device acting upon the drive train through an auxiliary-power source for completely or partially separating the vehicle engine from the driven wheels during braking pressure control, thereby accomplishing a reduction or a total elimination of the effect of the engine residual torque on the brakes during slip control.

4 Claims, 3 Drawing Sheets

ANTI-LOCK BRAKE SYSTEM WITH CLUTCH OR TRANSMISSION CONTROL

BACKGROUND OF THE INVENTION

The present invention relates to an anti-lock controlled brake system for an automotive vehicle, including a braking pressure generator, an auxiliary-pressure source and wheel sensors and electronic circuits for the determination of the rotational behavior of the vehicle wheels and for the generation of electric braking pressure control signals which provide for control of pressure-fluid inlelt valves and pressure-fluid outlet valves in the brake system pressure-fluid lines.

A known combined traction control and anti-lock control apparatus is disclosed in German published patent application No. 20 49 262 wherein the anti-lock system is designed as a four-channel system, there being provision of rotational speed sensors for monitoring the state of motion of the driven and the non-driven vehicle wheels. The sensors deliver in each case a voltage output signal that is proportional to the wheel circumferential speed. An inlet valve is provided for each individual wheel brake and provides for metering the braking pressure generated during actuation of the master brake cylinder into the respective wheel brake cylinder. An outlet valve is also provided through which brake fluid can be discharged from the wheel brake cylinder back into the supply reservoir of the brake system. The inlet valves and outlet valves are designed as two-way/two-position solenoid valves, with the initial postion of the inlet valve being normally open whereby the associated outlet pressure chamber of the master brake cylinder communicates with the respective wheel brake cylinder. The initial position of the outlet valve is normally closed whereby the wheel brake cylinder is noramlly shut off towards the supply reservoir. The inlet valves and outlet valves provided within the anti-lock system are controlable to assume their closed or opened position in the combination and sequence according to the anti-lock control through output control signals from an electronic control unit of the anti-lock system. The control unit processes the output signals from the wheel rotational speed sensors. For example, if a braking pressure decrease becomes necessary in one of the wheel brakes, the inlet valve associated with that wheel brake is actuated to assume its closed position and the outlet valve is actuated to assume its opened position.

This known brake slip control apparatus bears the disadvantage that the engine's residual torque, that is, the torque of the vehicle engine which acts on the driving-axle wheels even after controlled reduction of engine speed, counteracts control of the flux of force to the drive wheels.

It is known that a vehicle may reach an unstable driving condition if it rolls without being driven on a road surface with a particularly low frictional value. This occurs because the residual torque of the engine slows down the driving-axle wheels so far that the wheels get into the slip range. Conventional anti-lock control apparatuses regulate the brakes, for example on icy roads, to such extent that scarcely any braking effect is produced by the brake. However, conventional anti-lock control apparatuses aare unable to suppress the detrimental effect of the engine's residual torque during anti-lock control.

SUMMARY OF THE INVENTION

It is an object of the present invention to overcome the disadvantages of known anti-lock apparatuses and to provide a simple and safe system which is appropriate for all situations occurring in practice, which reduce the effect of the engine's residual torque on the driven wheels, during slip control.

The object is achieved and the shortcomings of the prior art are overcome by the invention which provides for a slip control brake system including an adjusting device which acts on the drive train during slip control to separate the vehicle engine from the driven wheels of the vehicle.

Advantageously, the invention prevents vehicle skidding on road sections having an extremely low frictional value.

According to a preferred embodiment of the invention, an auxiliary-power source includng a motor-pump unit supplies the braking pressure generator with pressure fluid.

According to another embodiment, the auxilary-power source includes a pressure-fluid accumulator which feeds pressure fluid to the braking pressure generator.

According to another embodiment, the auxiliary-power source may also be supplied by a motor-pump unit of a power steering booster.

According to a still further embodiment of the invention, the auxiliary force can be provided by a vacuum booster.

In a vehicle with a purely mechanical transmission, the adjusting device according to the invention is part of the hydraulic actuating device which operates the mechanical clutch.

According to the invention, the adjusting device in vehicles with automatic transmissions is part of the hydraulic control unit of the hydraulic gearing unit or part of the hydrodynamic torque converter. Accordingly, when the electronic controller of the slip control systems issues the signal to separate the vehicle engine from the driven wheels, the pressure fluid flowing from the auxiliary-power source may drive the valves of the control device or the brake cylinders and clutch cylinders provided in the gear unit either directly or through special slave cylinders.

In an alternative embodiment of this invention, switch pulses generated by the electronic controller of the system can also be supplied directly to the electronic control unit of a hydraulic gearing unit and thus bring about the interruption of the flux of force in the drive train, with the oil pump of the automatic transmission supplying the necessary auxiliary power, and with the valves of the control unit of the gearing unit being designed as electromagnetically actuatable valves.

Preferably, the adjusting device is actuatable according to an algorithm installed in the anti-lock system. The signal which the controller generates in order to disconnect the vehicle engine from the driven vehicle wheels opens a pressure-fluid conduit leading to the hydraulic gearing unit, and the pressure-fluid flow entering the gearing unit will directly actuate the brake elements and/or clutch elements of the hydraulic gearing unit.

BRIEF DESCRIPTION OF THE DRAWING

The present invention will be better understood after reading the following Detailed Description Of The Preferred Embodiment in conjunctionn with the accompanying drawings in which.

DETAILED DESCRIPTION OF THE PREFERRED EMBODIMENT

Figure 1:
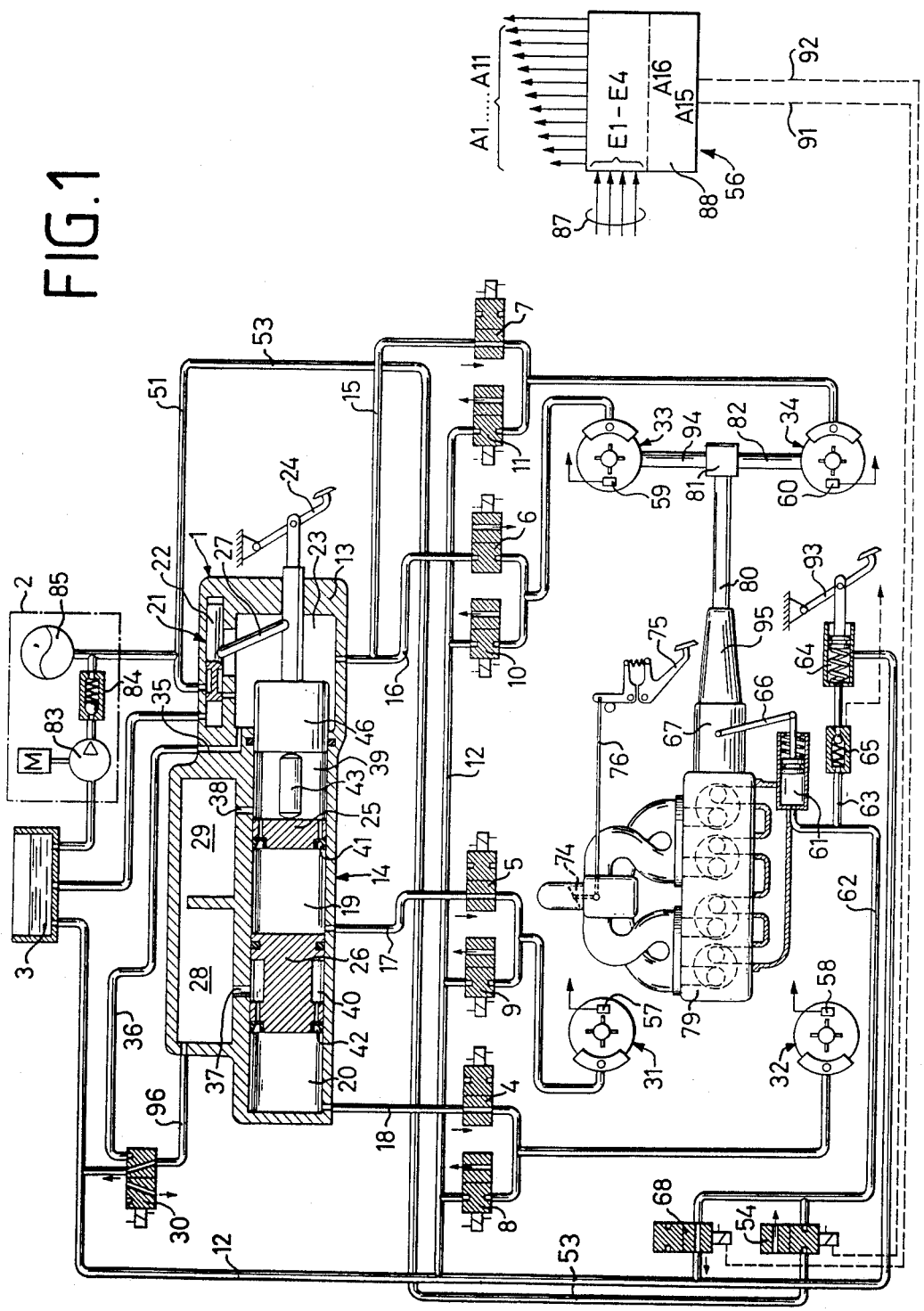
FIG. 1 is a schematic diagram of an anti-lock brake system including a hydraulic device for actuating a clutch of the vehicle.

The inventive control apparatus for controlling the application of a drive force to the vehicle wheels is shown in FIG. 1 and includes a pedal-actuated, elongated hydraulic braking pressure generator 1, an auxiliary-pressure source 2, a supply and pressure-compensating reservoir 3 and electromagnetically actuatable two-way/two-position directional control valves 4, 5, 6, 7, through which the wheel brakes 31, 32, 33, 34 of the front and rear wheels are connected to the braking pressure generator 1 in hydraulically isolated brake circuits 15, 16, 17, 18.

The directional control valves 4, 5, 6, 7, respectively, are normaly in their open-passage condition, that is, as long as they are not energized they are open and provide for passage of hydraulic fluid. Further, there is a return line 12 leading from the front and the rear wheels 31, 32, 33, and 34, respectively, to the compensating reservoir 3, however, the return line 12 is isolated from the wheels brakes by means of four additional two-way/two-position directional control valves 8, 9, 10, and 11 which are normally closed in their de-energized state.

The braking pressure generator 1 includes a hydraulic brake power booster 13 and a master cylinder assembly 14 with a piston-positioning device.

The brakes of the rear wheels 33, 34 are connected to the brake power booster 13, while the two working chambers 19 and 20 of the master cylinder assembly 14, which herein is designed as a tandem master cylinder 14, communicate by way of separate brake circuits 17 and 18 each with the wheel brake of a front wheel. The two master cylinder circuits 17, 18 are referred to as static pressure fluid circuits, whereas the rear brake circuits 15, 16 are referred to as dynamic pressure fluid circuits because in these circuits 15, 16 the pressure is determined by the position of a control valve 21 which is actuated by the pedal through a linkage 27 and which, depending on the displacement of a valve piston 22, permits more or less pressurized fluid to flow from the auxiliary-pressure source 2 into the booster chamber 23 and from there into the brake circuits 15, 16.

The pressure built up in the booster chamber 23 and introduced through the control valve 21 simultaneously acts by way of a booster piston 46 and an actuating rod 43 on the pistons 25, 26 of the master cylinder assembly 14. Accordingly, braking pressure builds up in the working chambers 19 and 20 of the two static brake circuits 17, 18. Initially, atmospheric pressure prevails in two prechambers 28, 29 of the master cylinder assembly 14 because these chambers are in communication with the pressure-compensating reservoir 3 by way of main valve 30 and a supply line 96 when the valve is in its inactive position, that is, when it is not excited.

Each wheel 31, 32, 33, 34 of the vehicle equipped with the inventive system is provided with a sensor 57, 58, 59, 60 which, for example, is designed as an inductive transducer and which feeds information about the wheel rotational behavior into an electronic controller 56. Among others, this controller 56 contains an electronic combining logic in the form of hard-wired or programmed circuits, such as microprocessors, and after evaluation of the senor signals produces control commands which are delivered to the corresponding solenoid valves over connecting signal lines, not shown.

In operation, upon the commncement of brake slip control, the main valve 30 will be changed over. This causes opening of a pressure fluid conduit 35, 36,96 leading from the booster chamber 23 into the prechambers 28, 29 so that pressure fluid flows into the prechambers 28, 29. This pressure propagates through connecting channels 37, 38 to annular chambers 39, 40 within the master cylinder assembly 14. From these chambers 39, 40, the pressure fluid flows through sleeve seals 41, 42 arranged at the periphery of the pistons 25, 26. The seals function as non-return valves, and the fluid is introduced dynamically into the working chambers 19, 20 which are in communication with the wheel brakes of the front wheels 57, 58.

The dynamically introduced pressure simultaneously results in resetting of the positioning tube of a positioning device, not referred to in more detail, as a consequence of which the pistons 25, 26 in the master cylinder assembly 14 assume a defined position in a well known manner.

Due to the dynamic introduction of pressure fluid into the static circuits 17, 18 of the front wheels 31, 32, complete depletion of working chambers 19 and 20 is avoided during slip control even in the event of frequent pressure reductions through discharge of pressure fluid through the changed-over directional control valves 8 and 9.

Should a defect occur in the auxiliary-energy supply system 2, which is composed of a motor-pump unit 83 with the associated no-return valve 84 and a pressure fluid reservoir 85, a pressure alarm circuitry (not illustrated in detail) will respond, and report the condition to the electric controller of the brake system and, depending on the magnitude of the residual pressure, will cause partial de-activation or disconnection of the brake slip control.

Defects in the dynamic pressure fluid conduit within the braking pressure generator 1, for example a defect in the booster chamber 23 or in the line 36 or a leaky main valve 30, can be detected by measuring the travel or by determining the position of the positioning device. If a leak or a defect in the pressure fluid conduit 35, 36,96 prevents the delivery of dynamic pressure into the annular chambers 39, 40, there results in a reduction in the volume in the working chambers 19, 20 and in a considerable shift of the positioning device when brake slip control takes plce, as a consequence, when the remainder of the pressure fluid volume in the front-wheel circuits becomes too small, a switch not shown in more detail will be actuated, and opens the signal path from the voltage source and will feed an error signal to the input of the electronic controller 56 whereby the system will be de-activated.

The pressure-fluid line 51 communicates by way of a branch line 53 and a two-way/two-position directional control valve 54 with the clutch pressure line 62 leading to a clutch slave cylinder 61. The line 62, in turn, communicates by way of branch line 63 with the clutch-actuating cylinder 64. The branch line 63 also includes an unlockable non-return valve 65. The clutch slave cylinder 61, through which the clutch actuating lever 66 of the clutch 67 is actuable, is in communication with a two-way/two-position directional control valve 68 through the clutch pressure line 62 which permits discharge of the pressure prevailing in the clutch slave cylinder 61.

The rotational behavoir of the individual vehicle wheels 31 to 34 is determined by the inductive transducers or sensors 57, 58, 59, 60. The information is delivered to the inputs $E_1$ to $E_4$ of the electronic controller 56 over the signal line bunch 87 indicated. Connected to the outputs $A_1 \ldots A_8$ of the controller 56 by signal lines (not illustrated in detail) are the braking pressure modulators 4, 5, 6, 7, 8, 9, 10, 11 which are inserted into the hydraulic circuits of the braking pressure generator 1 and which, in order to control the wheel slip on the occurrence of a tendency to lock, will either keep the braking pressure constant or will appropriately reduce it and re-increase it, if need be, in dependence on the controller's signals.

The valves 54, 68, for controlling the engagement and disengagement of the clutch 67 are connected to that part of the controller 56 which is illustrated symbolically by the portion 88 separated in dash-dot lines. This controller 88 governs the engagement and disengagement of the clutch 67 in dependence on several measured values and control variables in respect of driving dynamics. The data concerning the wheel rotational behavior which are applied to the inputs $E_1$ through $E_4$ of the controller 56 are evaluated also for the control of the clutch 67. A command to disengage the clutch 67 is issued via the output $A_{15}$ and via the electric signal line 91 in the form of an electric switch-over command to the electromagnetically actuatable two-way/two-position directional control valve 54 which is connected to the pressure line 53. Simultaneously, a second two-way/two-position directional control valve 68 is switched over by a signal at the output $A_{16}$ of the circut configuration 88 and via a signal line 92, whereby the connection of the clutch pressure line 62 to the pressure-compensating reservoir 3 is interrupted.

As long as the valve 68 is in its opened position shown and, therefore, the connection from the clutch-actuating cylinder 64 to the compensating reservoir 3 is open, the slave cylinder 61 does not have any influence on the position of the clutch lever 66. A clutch disengagement by applying a pedal force on the clutch pedal 93 is not possible in this switch position of the valve 68, since the clutch-actuating cylinder 64 is in communication with the pressure-compensating reservoir 3.

If it is recognized as a result of the logic combination of all data and signals supplied to the electronic controller 56 and in particular to the circuit configuraiton 88 within the controller that a disengagement of the clutch 67 would be an advantage in the particular situation, either instantaneously or after a delay time, depending on the situation and after the control has been performed, output signals are generated over the lines 91, 92 which cause change-over of the directional control valves 54, 68. This causes the introduction of hydraualic pressure into the working chamber of the actuating cylinder 61, whereby the piston is displaced which, in turn, swivels the clutch-actuating lever 66 and thereby causes disengagement of the clutch 67 so that the drive engine 79 of the vehicle is uncoupled from the drive train 80, 81, 82.

The system illustrated in FIG. 1 for the wheel torque control of the driven wheels 33, 34 makes use of the auxiliary-power source 2 and the rotational speed sensors 59, 60 and part of the electronic controller 56 of an anti-lock brake system.

It is clear that, instead of an auxiliary-pressure source 2 with a motor-pump unit 83, an accumulator 85 and a non-return valve 84, for exmaple, the accumulator or the pump of a power steering system, can be connected to the pressure lines 51, 53, for the purpose of supplying auxiliary energy to the adjusting device 54, 68, 62, 61, 66 which acts upon the drive trian 95, 81, 82, 94. The adjusting device also can be in operative engagement with a vacuum power booster (not shown) operatively coupled to the master cylinder assembly 14 and the pressure lines 51, 53.

Figure 2:
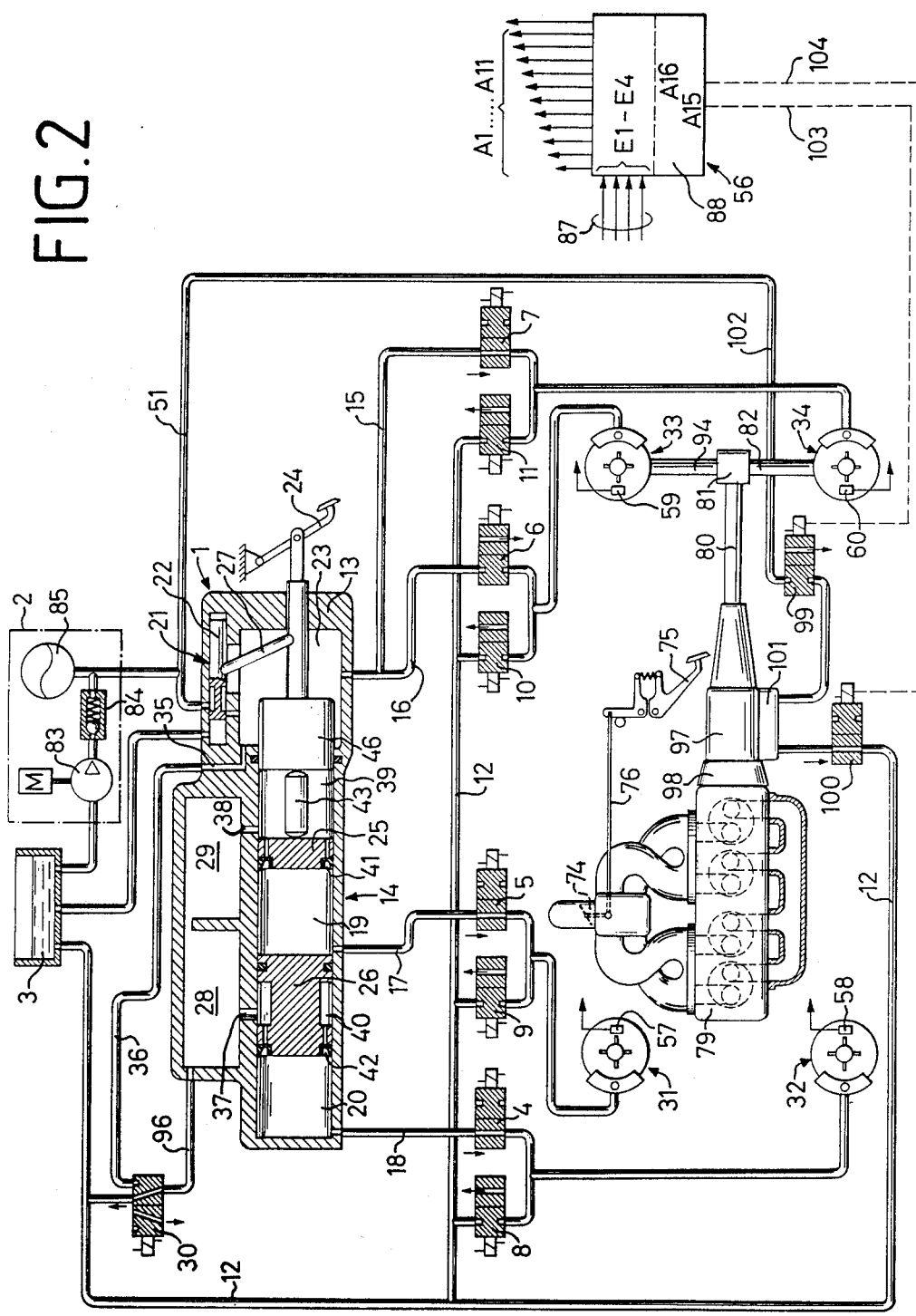
FIG. 2 is a schematic diagram of an anti-lock brake system for use in a vehicle having an automatic transmission.

The system for the traction slip control illustrated in FIG. 2 differs from that according to FIG. 1 mainly in that, instead of a dry clutch with a mechanicjal gearbox, there is a hydraulic gearing unit 97 with control unit 101 and a converter 98 connected upstream thereof. Pressure fluid from the auxiliary-power source 2 is introduced intò the control unit 101 whenever the controller 56 signals the two-way/two-position directional control valve 99 over line 103 to open upon the occurrence of wheel slip. Due to the pressure which will then be prevailing at the control unit 101, the hydraulic transmission 97 and/or the hydraulic clutch 98 can be actuaged such that the flux of force from the vehicle engine 79 to the output shaft 80 is interrupted and the vehicle wheels 33, 36 can turn freely. The pressure fluid introduced into the control unti 101 can subsequently discharge into the reservoir 3 through the two-way/two-position directional control valve 100, which is switched to its opened position via the signal line 104, and the unpressurized return line 12. Accordingly, the hydraulic gearing unit 97 can be designed such that the pressure fluid introduced either actuates directly the clutches in the gearing unit and the brake device, or acts via adjusting cylinders on valves in the gearing unit 97.

Figure 3:
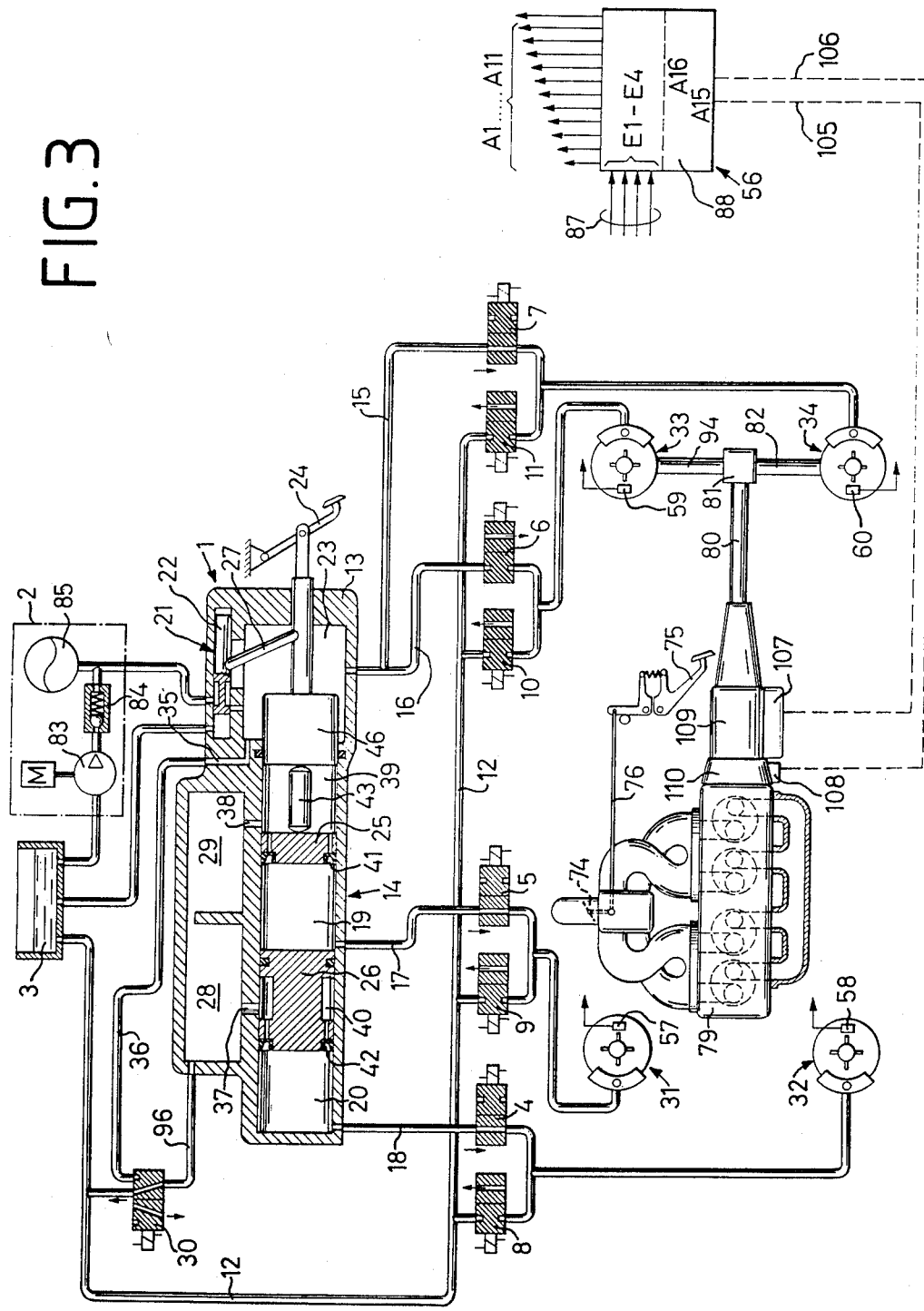
FIG. 3 is a schematic diagram of an anti-lock brake system for a vehicle, wherein, for the purpose of control, the electric control unit of a hydraulic gearing unit is directly drivable by the electronic controller of the system.

In the embodiment according to FIG. 3, there is no introduction of pressure fluid out of the auxiliary-power source 2 into the control unit 107 of the hydraulic gearing unit 109, 110. Instead, the electric signal produced by the controller 57 is supplied over the signal lines 105, 106 directly to the control unit 107 which is designed such that the valves provided in the control unit 107, 108 are directly actuated electrically. The pressure fluid pump in the hydraulic gearing unit generates the auxiliary power required for the actuation of the necessary brake and clutch actions.

I claim:

1. An anti-lock controlled brake system for automotive vehicles, comprising a braking pressure generator, an auxiliary-pressure source, a plurality of wheel sensors, an electronic controller for determining wheel rotational behavior and for generating electric braking pressure control signals which control individual pressure-fluid lines connected to wheel brakes, a drive train connected between an engine and a pair of driven wheels and clutch means actuatable by the auxiliary-power source for at least partially disengaging the vehicle engine from the driven wheels during brake slip control in response to said controller, said clutch means including a clutch member (67) which is actuated by a clutch lever (66) connected to a piston rod of a slave cylinder (61), said slve cylinder (61) having a first hydraulic input (62) responsive to said controller and said slave cylinder having a second hydraulic input (63) connected in parallel with said first hydraulic input (62) and responsive to a clutch-pedal-actuated cylinder, and said clutch means including a directional control valve (68) responsive to said controller connecting said first and second hydraulic inputs to an unpressurized reservoir and wherein actuation of said clutch member (67) by said clutch lever (66) is precluded when said directional control valve is open.

2. An anti-lock controlled brake system as claim in claim 1, wherein the auxiliary-power source which actuates the clutch means is formed by a motor-pump unit of the braking pressure generator.

3. Anti-lock controlled brake system as claimed in claim 1, wherein the auxiliary-power source which actuates the clutch means is formed by a pressure-fluid accumulator of the braking pressure generator.

4. An anti-lock controlled brake system as claimed in claim 1, wherein the clutch means is part of a hydraulic actuating device of a mechanically operated clutch.

* * * * *